(12) United States Patent
Ichikawa et al.

(10) Patent No.: US 11,326,689 B2
(45) Date of Patent: May 10, 2022

(54) SHIFTER ABNORMALITY DIAGNOSIS DEVICE AND SHIFTER ABNORMALITY DIAGNOSIS METHOD

(71) Applicants: JATCO Ltd, Fuji (JP); NISSAN MOTOR CO., LTD., Yokohama (JP)

(72) Inventors: Keisuke Ichikawa, Atsugi (JP); Tomoaki Kabe, Nagoya (JP); Kosuke Abe, Gwangmyeong-si (KR)

(73) Assignees: JATCO Ltd, Fuji (JP); NISSAN MOTOR CO., LTD., Yokohama (JP)

( * ) Notice: Subject to any disclaimer, the term of this patent is extended or adjusted under 35 U.S.C. 154(b) by 250 days.

(21) Appl. No.: 16/626,364

(22) PCT Filed: Jun. 26, 2018

(86) PCT No.: PCT/JP2018/024110
§ 371 (c)(1),
(2) Date: Dec. 24, 2019

(87) PCT Pub. No.: WO2019/004165
PCT Pub. Date: Mar. 1, 2019

(65) Prior Publication Data
US 2020/0116254 A1  Apr. 16, 2020

(30) Foreign Application Priority Data
Jun. 28, 2017  (JP) .............................. JP2017-126475

(51) Int. Cl.
*F16H 61/12* (2010.01)
*F16H 59/10* (2006.01)
(Continued)

(52) U.S. Cl.
CPC ............. *F16H 61/12* (2013.01); *F16H 59/10* (2013.01); *F16H 59/0204* (2013.01);
(Continued)

(58) Field of Classification Search
CPC ...... F16H 61/12; F16H 59/10; F16H 59/0204; F16H 61/686; F16H 2059/0239; F16H 2061/1208; F16H 2061/1264
See application file for complete search history.

(56) References Cited

U.S. PATENT DOCUMENTS 5,737,979 A  *  4/1998  McKenzie ............ F16H 61/061
74/731.1
10,926,769 B1 *  2/2021  Jancowski-Walsh ........................
F16H 61/682
(Continued)

FOREIGN PATENT DOCUMENTS

JP        2010-285056 A     12/2010

*Primary Examiner* — David M Fenstermacher
(74) *Attorney, Agent, or Firm* — Foley & Lardner LLP

(57) ABSTRACT

A shifter abnormality diagnosis device for a shifter used in an automatic transmission having a manual mode, the shifter including a first switch for outputting a signal corresponding to the position of a select lever and a second switch for outputting a signal corresponding to the position of the select lever if the select lever is located in at least one of an upshift range or a downshift range, wherein the abnormality diagnosis device is configured to perform an abnormality diagnosis of the second switch on the basis of an output signal of the second switch and prohibit the abnormality diagnosis of the second switch if it is determined that the select lever is not located in any one of forward ranges including the upshift range and the downshift range on the basis of an output signal of the first switch.

4 Claims, 4 Drawing Sheets

(51) Int. Cl.
*F16H 59/02* (2006.01)
*F16H 61/686* (2006.01)

(52) U.S. Cl.
CPC .... *F16H 61/686* (2013.01); *F16H 2059/0239* (2013.01); *F16H 2061/1208* (2013.01); *F16H 2061/1264* (2013.01)

(56) References Cited

U.S. PATENT DOCUMENTS

| | | | | |
|---|---|---|---|---|
| 2004/0053743 A1* | 3/2004 | Tsuzuki | ................ | F16H 59/105 477/97 |
| 2005/0107214 A1* | 5/2005 | Koenig | ................ | F16H 61/688 477/174 |
| 2006/0276300 A1* | 12/2006 | Kashiwagi | ............. | F16H 61/12 477/34 |
| 2008/0090700 A1* | 4/2008 | Miller | .................... | F16H 61/12 477/131 |
| 2009/0171544 A1* | 7/2009 | Tanaka | .................... | F16H 61/32 701/55 |
| 2013/0096787 A1* | 4/2013 | Holub | .................... | F16H 61/12 701/54 |
| 2013/0151092 A1* | 6/2013 | Spaulding | ........... | F16H 59/0217 701/55 |
| 2013/0233110 A1* | 9/2013 | Kinoshita | ............... | F16H 59/08 74/473.11 |
| 2015/0066316 A1* | 3/2015 | Fujii | .................... | F16H 59/0204 701/51 |
| 2015/0198235 A1* | 7/2015 | Baumgartner | ...... | B60W 50/082 701/52 |
| 2016/0281846 A1* | 9/2016 | Hippalgaonkar | ....... | F16H 61/12 |
| 2017/0284537 A1* | 10/2017 | Kojima | ....... | F16H 61/0204 |
| 2018/0354496 A1* | 12/2018 | Ruybal | .................... | B60K 6/48 |
| 2019/0032777 A1* | 1/2019 | Kucharski | ............ | F16D 48/062 |
| 2019/0047568 A1* | 2/2019 | Gittins | ................ | F16H 63/3483 |
| 2020/0018394 A1* | 1/2020 | Kim | .................... | F16H 59/105 |
| 2020/0080633 A1* | 3/2020 | Tsuji | ....................... | F16H 63/42 |

\* cited by examiner

SHIFTER ABNORMALITY DIAGNOSIS DEVICE AND SHIFTER ABNORMALITY DIAGNOSIS METHOD

TECHNICAL FIELD

The present invention relates to a shifter abnormality diagnosis device and a shifter abnormality diagnosis method.

BACKGROUND ART

JP2010-285056A discloses a shifter with a sensor for detecting the position of a select lever.

In the above shifter, an abnormality of the sensor is diagnosed on the basis of a signal output from the sensor.

SUMMARY OF INVENTION

Immediately after an ignition switch is turned on, i.e. immediately after the sensor is energized, there is a possibility that the sensor does not stably operate, and it is assumed that the sensor outputs no signal or outputs a plurality of signals indicating the position of the select lever.

Here, if an automatic transmission has a manual mode, the shifter is provided with a manual mode switch for outputting a signal corresponding to the position of the select lever when the select lever is located in an upshift range, a downshift range or the like.

Such a switch also possibly does not stably operate immediately after the ignition switch is turned on and is thought to output no signal or output a plurality of signals indicating the position of the select lever.

However, such an unstable state is temporary. Thus, if an abnormality diagnosis of the switch is performed in this state, there is a possibility that the abnormality of the switch is erroneously determined although the switch has no abnormality.

The present invention was developed in view of such a technical problem and aims to prevent the erroneous determination of a switch abnormality.

According to one aspect of the present invention, a shifter abnormality diagnosis device for a shifter used in an automatic transmission having a manual mode, the shifter including a first switch for outputting a signal corresponding to the position of a select lever and a second switch for outputting a signal corresponding to the position of the select lever if the select lever is located in at least one of an upshift range or a downshift range, the abnormality diagnosis device comprising diagnosis means for performing an abnormality diagnosis of the second switch on the basis of an output signal of the second switch and prohibition means for prohibiting the abnormality diagnosis of the second switch by the diagnosis means if it is determined that the select lever is not located in any one of forward ranges including the upshift range and the downshift range on the basis of an output signal of the first switch.

According to another aspect of the present invention, a shifter abnormality diagnosis method for a shifter used in an automatic transmission having a manual mode, the shifter including a first switch for outputting a signal corresponding to the position of a select lever and a second switch for outputting a signal corresponding to the position of the select lever if the select lever is located in at least one of an upshift range or a downshift range, the abnormality diagnosis method comprising performing an abnormality diagnosis of the second switch on the basis of an output signal of the second switch and prohibiting the abnormality diagnosis of the second switch if it is determined that the select lever is not located in any one of forward ranges including the upshift range and the downshift range on the basis of an output signal of the first switch.

According to these aspects, if the select lever is not located in the forward range, the abnormality diagnosis of the second switch is prohibited. When an ignition switch is turned on, the select lever is thought to be located in a P (parking)-range. Thus, the abnormality diagnosis of the second switch can be prevented from being performed during an unstable operation period immediately after the ignition switch is turned on, and erroneous determination can be prevented.

DESCRIPTION OF EMBODIMENT

Hereinafter, an embodiment of the present invention is described with reference to the accompanying drawings.

Figure 1:
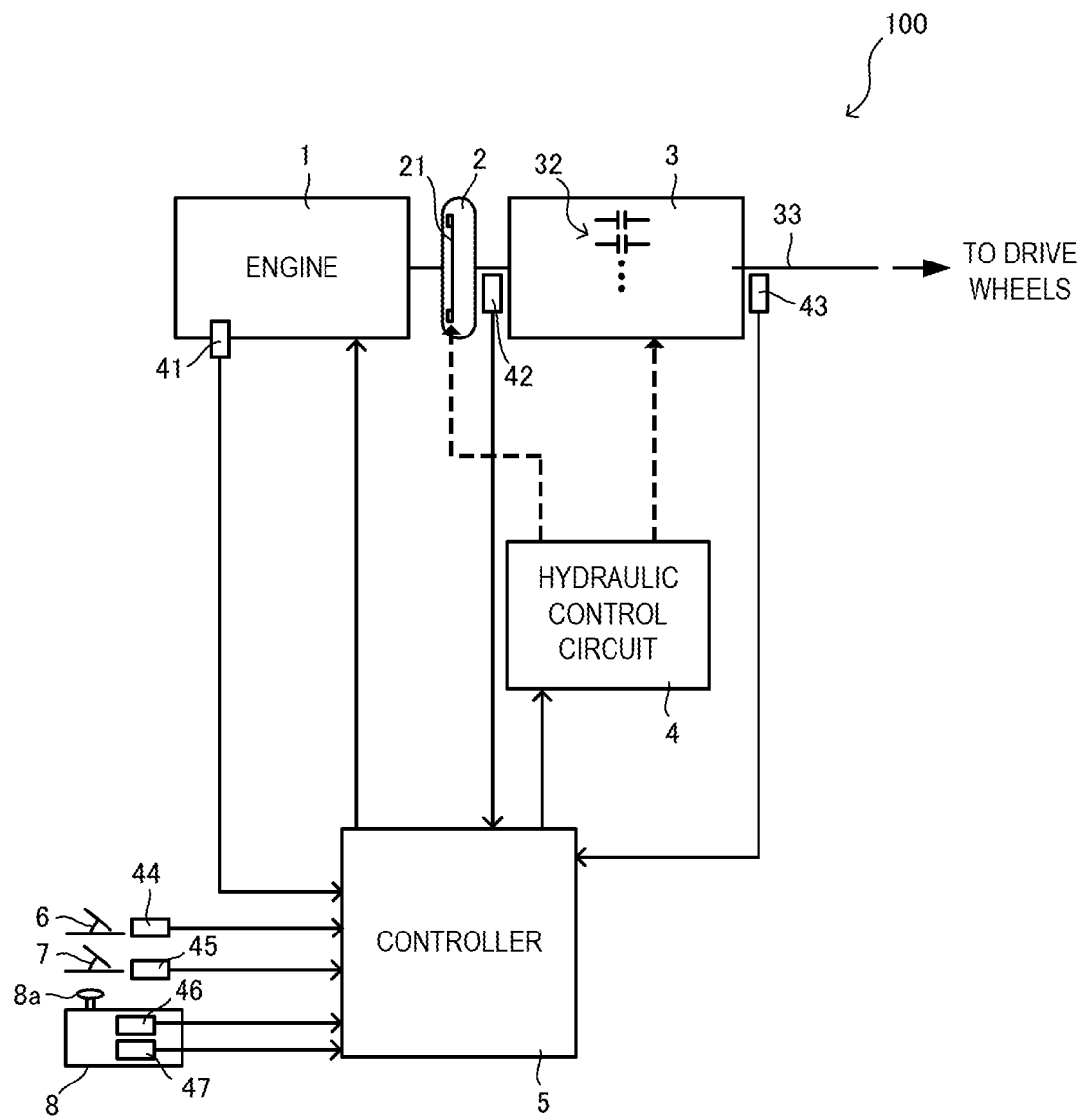
FIG. 1 is a schematic configuration diagram of a vehicle to which an abnormality diagnosis device according to an embodiment of the present invention is applied.
Figure 2:
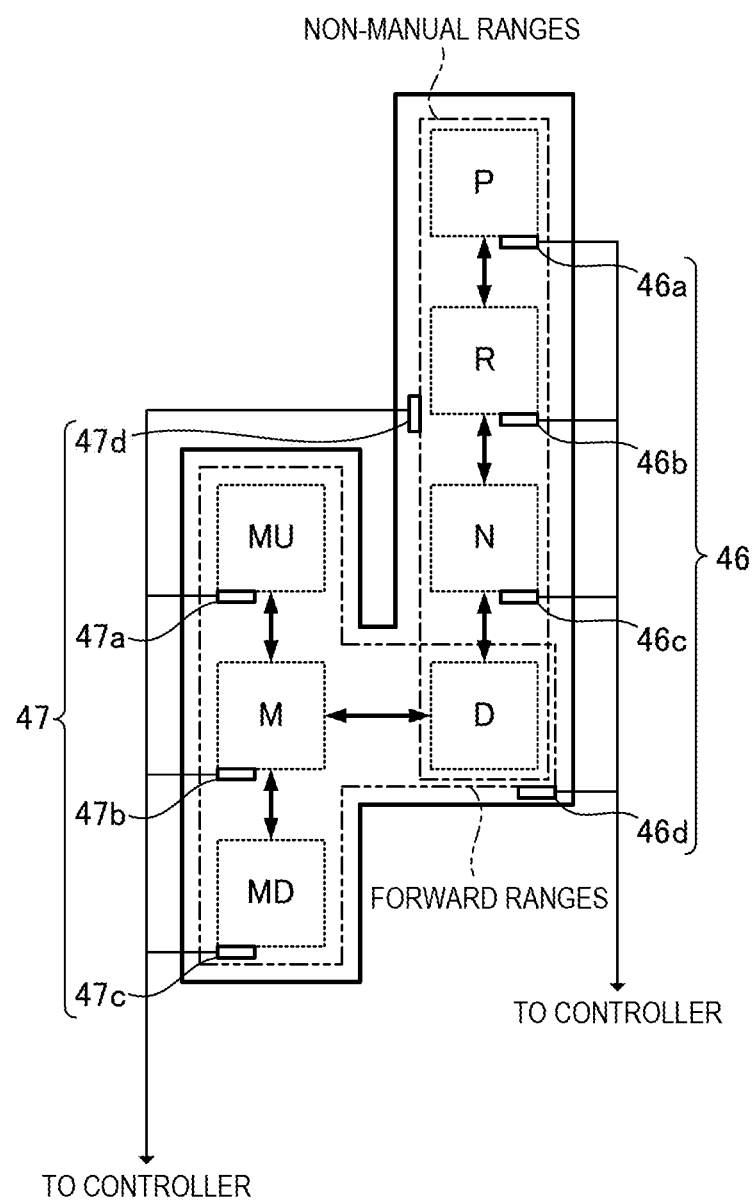
FIG. 2 is a diagram showing a shifter.

FIG. 1 is a schematic configuration diagram of a vehicle 100 to which an abnormality diagnosis device according to the embodiment of the present invention is applied. FIG. 2 is a diagram showing a shifter 8.

The vehicle 100 includes an engine 1, a torque converter 2 and an automatic transmission 3 and is configured such that output rotation of the engine 1 is transmitted to unillustrated drive wheels via the torque converter 2 and the automatic transmission 3.

The torque converter 2 is a torque converter with a lock-up clutch 21. If the lock-up clutch 21 is engaged, an input shaft and an output shaft are directly coupled and transmission loss due to a slip inside the torque converter 2 can be reduced.

The automatic transmission 3 is a stepped automatic transmission having a plurality of forward gear positions and one reverse gear position. The gear position can be changed by changing a combination of engaging elements 32 to be engaged out of a plurality of engaging elements 32 (clutch(es), brake(s)) arranged inside the automatic transmission 3.

Further, the automatic transmission 3 has a manual mode capable of shifting up and down the gear position by a driver operating a select lever 8a of the shifter 8.

Thus, the shifter 8 is provided with an M-range, an MU (upshift)-range and a MD (downshift)-range in which the select lever 8a is operated in the manual mode in addition to a P (parking)-range, an R (reverse)-range, an N (neutral)-range and a D (automatic shift)-range as shown as a shift pattern in FIG. 2.

The gear position of the automatic transmission 3 is maintained if the M-range is selected by the select lever 8a, shifted up if the MU-range is selected and shifted down if the MD-range is selected.

The select lever 8a has a momentary type lever structure to automatically return to the M-range when the driver releases his/her hand from the select lever 8*a* between the M-range and the MU-range and between the M-range and the MD-range.

It should be noted that the D-range, the M-range, the MU-range and the MD-range constitute forward ranges, in which the vehicle 100 is driven to travel forward, as shown by a two-dot chain line in the present embodiment.

Further, as shown in FIG. 1, the vehicle 100 is provided with a hydraulic control circuit 4 for adjusting a pressure of hydraulic oil supplied from an oil pump (not shown) and supplying the adjusted pressure to the lock-up clutch 21 and each part of the automatic transmission 3, and a controller (abnormal diagnosis device, diagnosis means, prohibition means) 5 for controlling the hydraulic control circuit 4 and the like.

The hydraulic control circuit 4 switches a hydraulic pressure supply path by controlling a plurality of solenoid valves (not shown), generates a necessary hydraulic pressure by adjusting the pressure of the hydraulic oil supplied from the oil pump and supplies the generated hydraulic pressure to the lock-up clutch 21 and each part of the automatic transmission 3 on the basis of a control signal from the controller 5.

The controller 5 is configured to include a CPU, a ROM, a RAM, an input/output interface, a bus connecting these and the like, and integrally controls a rotation speed and a torque of the engine 1, an engaged state of the lock-up clutch 21, the gear position of the automatic transmission 3 and the like on the basis of signals from sensors for detecting a state of each part of the vehicle 100.

The sensors include, for example, a rotation speed sensor 41 for detecting a rotation speed Ne of the engine 1, a rotation speed sensor 42 for detecting a rotation speed Nt of the output shaft of the torque converter 2, a rotation speed sensor 43 for detecting a rotation speed Ns of an output shaft 33 of the automatic transmission 3, an accelerator pedal opening sensor 44 for detecting an operated state of an accelerator pedal 6, a brake switch 45 for detecting an operated state of a brake pedal 7, an inhibitor switch 46 serving as a first switch for detecting which of the P-range, the R-range, the N-range and the forward ranges has been selected by the select lever 8*a*, a manual switch 47 serving as a second switch for detecting which of the M-range, the MU-range, the MD-range, the non-manual ranges other than the ranges in which the select lever 8*a* is operated in the manual mode, has been selected by the select lever 8*a*, and the like.

In the present embodiment, the P-range, the R-range, the N-range and the D-range constitute the non-manual ranges as shown by a dashed-dotted line in FIG. 2.

As shown in FIG. 2, the inhibitor switch 46 is constituted by a P-range switch 46*a* which is turned on to output a signal when the select lever 8*a* is located in the P-range, an R-range switch 46*b* which is turned on to output a signal when the select lever 8*a* is located in the R-range, an N-range switch 46*c* which is turned on to output a signal when the select lever 8*a* is located in the N-range and a forward range switch 46*d* which is turned on to output a signal when the select lever 8*a* is located in the forward range.

In this way, any one of signals of the switches 46*a* to 46*d* is selectively output from the inhibitor switch 46 to the controller 5.

As shown in FIG. 2, the manual switch 47 is constituted by a MU-range switch 47*a* which is turned on to output a signal when the select lever 8*a* is located in the MU-range, an M-range switch 47*b* which is turned on to output a signal when the select lever 8*a* is located in the M-range, an MD-range switch 47*c* which is turned on to output a signal when the select lever 8*a* is located in the MD-range and a non-manual range switch 47*d* which is turned on to output a signal when the select lever 8*a* is located in the non-manual range.

In this way, any one of signals of the switches 47*a* to 47*d* is selectively output from the manual switch 47 to the controller 5.

The controller 5 performs each abnormality diagnosis on the basis of the signals from each of the above sensors, and executes a control corresponding to a diagnostic content if the occurrence of an abnormality has been determined.

By the way, immediately after an ignition switch (not shown) of the vehicle 100 is turned on, there is a possibility that the manual switch 47 does not stably operate. Thus, it is assumed that the manual switch 47 outputs no signal or outputs a plurality of signals.

However, such an unstable state is temporary immediately after energization. Thus, if the controller 5 performs an abnormality diagnosis of the manual switch 47 in this state, there is possibility that the abnormality of the manual switch 47 is erroneously determined although the manual switch 47 has no abnormality.

Figure 3:
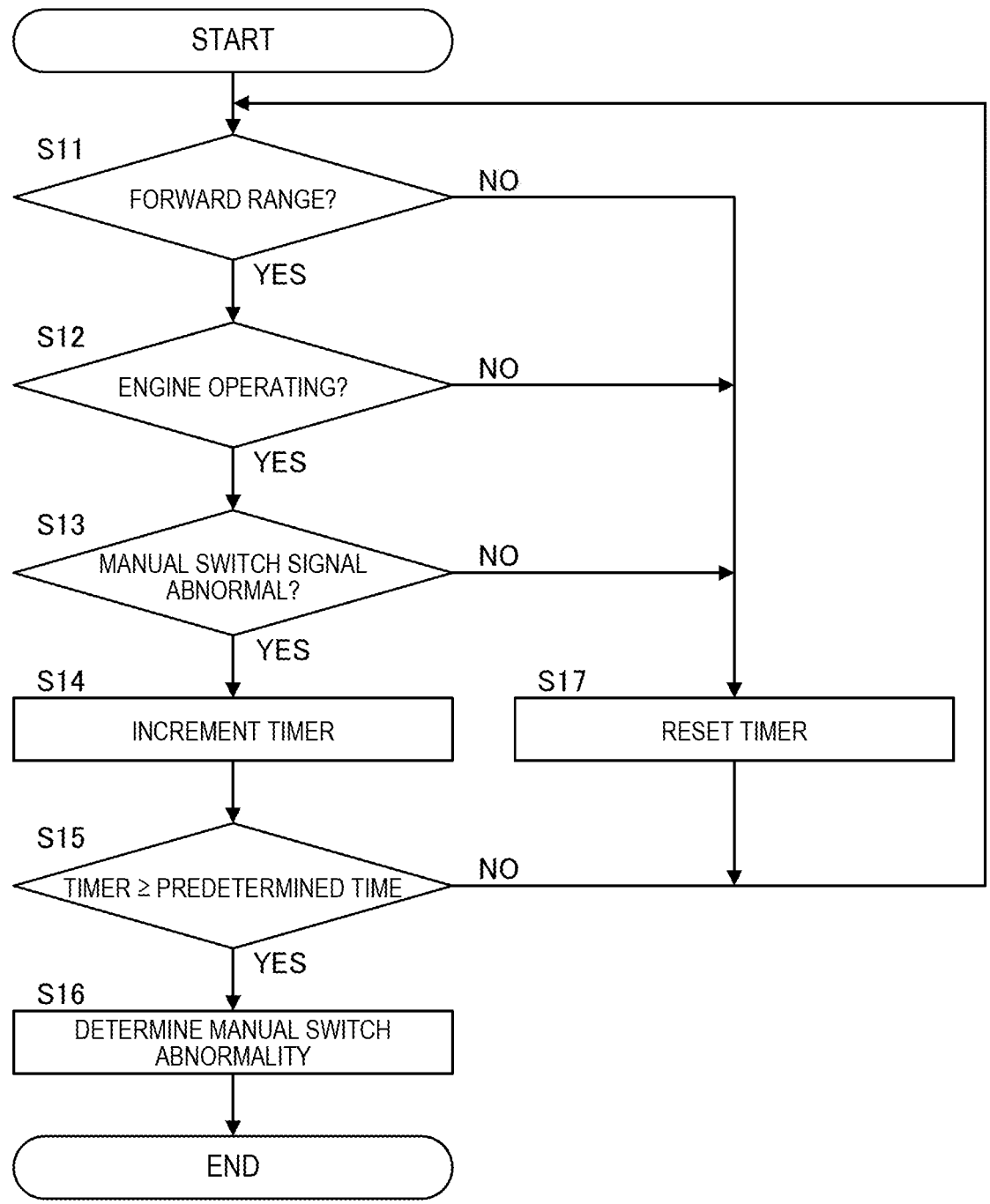
FIG. 3 is a flow chart showing contents of an abnormality diagnosis process.

Thus, the controller 5 of the present embodiment performs an abnormality diagnosis process for the manual switch 47 in accordance with the procedure of a flow chart shown in FIG. 3.

The abnormality diagnosis process for the manual switch 47 performed by the controller 5 is described below with reference to FIG. 3. It should be noted that the controller 5 repeatedly performs the abnormality diagnosis process in a state where the ignition switch is on. A computation cycle is, for example, 10 ms.

In Step S11, the controller 5 determines whether or not the select lever 8*a* is located in the forward range.

Specifically, the controller 5 determines that the select lever 8*a* is located in the forward range if a signal from the inhibitor switch 46 is a signal indicating that the forward range switch 46*d* is on.

The controller 5 proceeds the process to Step S12 if the select lever 8*a* is determined to be located in the forward range. Further, if it is determined that the select lever 8*a* is not located in the forward range, the controller 5 proceeds the process to Step S17.

In Step S17, the controller 5 resets a value of a timer and proceeds the process to Step S11. The timer will be described later.

In Step S12, the controller 5 determines whether or not the engine 1 is operating.

The engine 1 can be determined to be operating, for example, if the rotation speed Ne detected by the rotation speed sensor 41 is equal to or higher than a predetermined rotation speed. The predetermined rotation speed is, for example, 500 rpm.

If the engine 1 is determined to be operating, the controller 5 proceeds the process to Step S13. Further, if it is determined that the engine 1 is not operating, the controller 5 proceeds the process to Step S17.

In Step S13, the controller 5 determines whether or not a signal from the manual switch 47 is abnormal.

As described above, the manual switch 47 selectively outputs any one of signals of the switches 47*a* to 47*d*. Thus, if no signal is input from the manual switch 47 or if a signal indicating that any two or more of the switches 47*a* to 47*d* are on is input, the controller 5 determines that the signal from the manual switch 47 is abnormal.

If the signal from the manual switch 47 is determined to be abnormal, the controller 5 proceeds the process to Step S14. Further, if the signal from the manual switch 47 is determined to be normal, the controller 5 proceeds the process to Step S17.

In Step S14, the controller 5 increments the value of the timer. It should be noted that if a measurement by the timer has not started, the controller 5 starts the measurement by the timer.

In Step S15, the controller 5 determines whether or not the value of the timer has reached a predetermined time or more. The predetermined time is, for example, 5 sec.

If the value of the timer is determined to have reached the predetermined time or more, the controller 5 proceeds the process to Step S16 and determines that the manual switch 47 is abnormal. Further, if it is determined that the value of the timer has not reached the predetermined time or more, the controller 5 proceeds the process to Step S11.

As just described, the controller 5 of the present embodiment performs the measurement by the timer if a condition that the select lever 8a is located in the forward range, the engine 1 is not stopped and the signal from the manual switch 47 is abnormal is satisfied.

If a state where the above condition is satisfied continues for a predetermined time or more, the manual switch 47 is determined to be abnormal.

That is, if the select lever 8a is not located in the forward range and if the engine 1 is stopped, the abnormality diagnosis of the manual switch 47 is prohibited even if the signal from the manual switch 47 is abnormal.

When the ignition switch is turned on, the select lever 8a is thought to be located in the P-range. Thus, by prohibiting the abnormality diagnosis if the select lever 8a is not located in the forward range, the abnormality diagnosis of the manual switch 47 can be prevented from being performed during an unstable operation period immediately after the ignition switch is turned on, and erroneous operation can be prevented.

Further, that the engine 1 is stopped means a state where the vehicle 100 is not traveling. Since the abnormality diagnosis of the manual switch 47 only has to be performed in a state where the vehicle 100 can be driven to travel forward, erroneous determination can be prevented by prohibiting the abnormality diagnosis if the engine 1 is stopped.

Next, a state of performing the abnormality diagnosis process is described with reference to FIG. 4.

Figure 4:
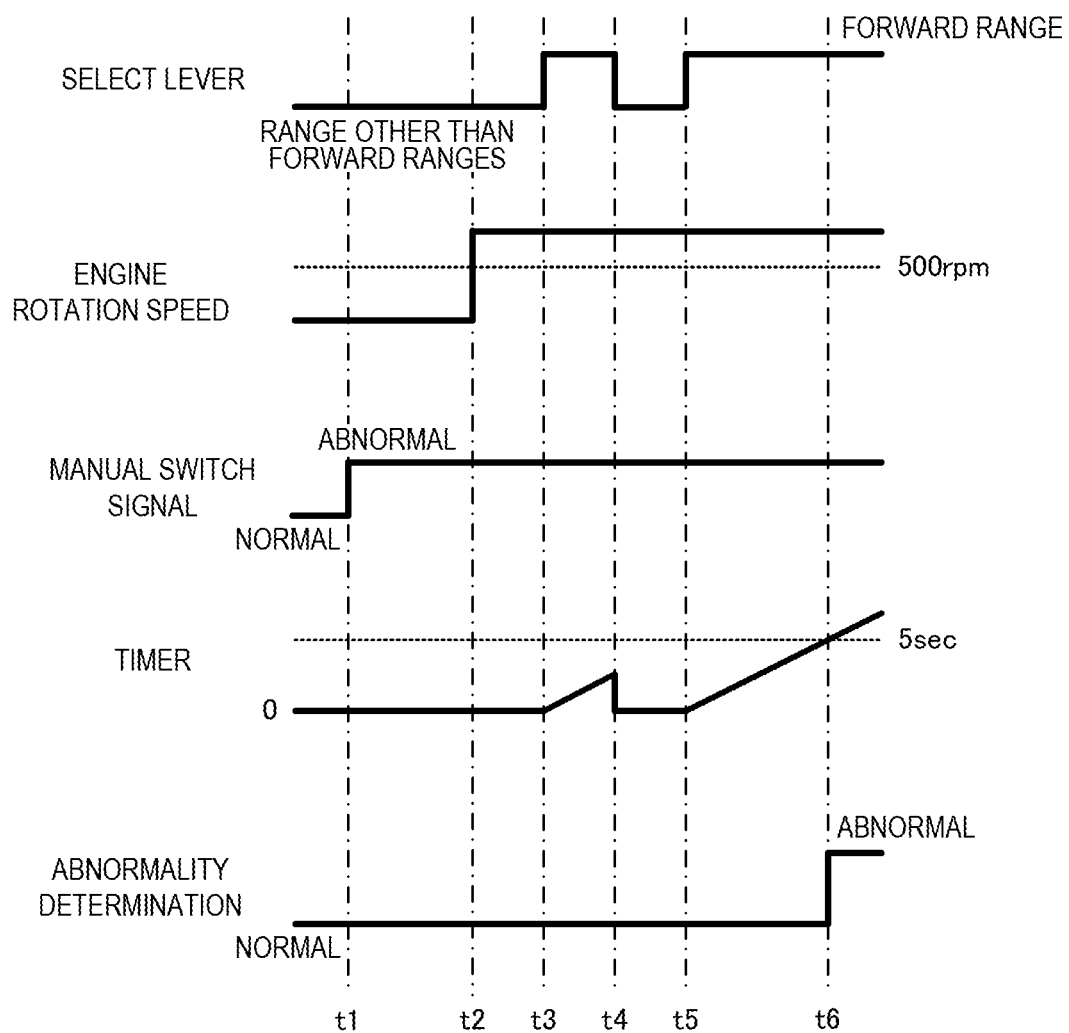
FIG. 4 is a time chart showing a state of performing the abnormality diagnosis process.

In a time chart of FIG. 4, a signal input from the manual switch 47 to the controller 5 is abnormal at time t1 after the ignition switch is turned on.

However, at this point of time, the controller 5 determines that the manual switch 47 is normal.

If the engine 1 starts and the rotation speed Ne increases to the predetermined rotation speed of 500 rpm or higher at time t2 and the select lever 8a is operated to select the forward range at time t3, the measurement by the timer is started.

At time t4, the select lever 8a is operated to select the range other than the forward ranges and the timer is reset. Thus, the controller 5 determines that the manual switch 47 is normal also at time t4.

If the select lever 8a is operated to select the forward range again at time t5, the measurement by the timer is started again.

If the timer reaches the predetermined time of 5 sec or more at time t6, the controller 5 determines that the manual switch 47 is abnormal.

As described above, the shifter 8 used in the automatic transmission 3 having the manual mode includes the inhibitor switch 46 for outputting a signal corresponding to the position of the select lever 8a and the manual switch 47 for outputting a signal corresponding to the position of the select lever 8a if the select lever 8a is located in at least one of the MU range or the MD range. The controller 5 serving as an abnormality diagnosis device for the shifter 8 performs the abnormality diagnosis of the manual switch 47 on the basis of an output signal of the manual switch 47 and prohibits the abnormality diagnosis of the manual switch 47 if it is determined that the select lever 8a is not located in any one of the forward ranges including the MU-range and the MD-range on the basis of the output signal of the inhibitor switch 46.

According to this, if the select lever 8a is not located in the forward range, the abnormality diagnosis of the manual switch 47 is prohibited. When the ignition switch is turned on, the select lever 8a is thought to be located in the P-range. Thus, the abnormality diagnosis of the manual switch 47 may be prohibited only if the select lever 8a is located in the P-range. However, since the position of the select lever 8a may be operated by the driver immediately after the ignition switch is turned on, the abnormality diagnosis is prohibited also if the select lever 8a is not located in the forward range, i.e. located in the P-range, the N-range or the R-range in the present embodiment. In this way, the abnormality diagnosis of the manual switch 47 can be prevented from being performed during the unstable operation period immediately after the ignition switch is turned on, and erroneous determination can be prevented. Further, it is also considered to defer the determination until an abnormal state continues for a predetermined time without prohibiting the abnormality diagnosis of the manual switch 47. However, since erroneous detection may be made depending on a communication timing or the like even if the determination is deferred, the abnormality diagnosis is prohibited in the present embodiment. In this way, the erroneous determination of an abnormal state due to a communication timing or the like can be prevented.

Further, the controller 5 prohibits the abnormality diagnosis of the manual switch 47 if the engine 1 is stopped.

That the engine 1 is stopped means a state where the vehicle 100 is not traveling. Since the abnormality diagnosis of the manual switch 47 only has to be performed in a state where the vehicle 100 can be driven to travel forward, erroneous determination can be prevented by prohibiting the abnormality diagnosis if the engine 1 is stopped.

Although the embodiment of the present invention has been described above, the above embodiment is merely an illustration of one application example of the present invention and not intended to limit the technical scope of the present invention to the specific configuration of the above embodiment.

For example, the controller 5 for integrally controlling the vehicle 100 functions as the abnormality diagnosis device in the above embodiment. However, a controller serving as the abnormality diagnosis device for the shifter 8 may be separately provided or another controller (not shown) of the vehicle 100 may perform the abnormality diagnosis process. Further, the abnormality diagnosis device may be constituted by a plurality of controllers.

Further, although the automatic transmission 3 has been described to be a stepped automatic transmission in the above embodiment, the automatic transmission 3 may be a continuously variable automatic transmission.

Further, the M-range, the MU-range and the MD-range are set as ranges in which the select lever 8a is operated in the manual mode in the above embodiment. However, further another range may be set as a range in which the select lever 8a is operated in the manual mode or only the MU-range and the MD-range may be set.

With respect to the above description, the contents of application No. 2017-126475, with a filing date of Jun. 28, 2017 in Japan, are incorporated herein by reference.

The invention claimed is:

1. A shifter abnormality diagnosis device for a shifter used in an automatic transmission having a manual mode, the shifter including:
   a first switch for outputting a signal corresponding to the position of a select lever: and
   a second switch for outputting a signal corresponding to the position of the select lever if the select lever is located in at least one of an upshift range or a downshift range, wherein
   the abnormality diagnosis device is configured to
   perform an abnormality diagnosis of the second switch on the basis of an output signal of the second switch; and
   prohibit the abnormality diagnosis of the second switch if it is determined that the select lever is not located in any one of forward ranges including the upshift range and the downshift range on the basis of an output signal of the first switch.

2. The shifter abnormality diagnosis device according to claim 1, wherein:
   the abnormality diagnosis device is configured to prohibit the abnormality diagnosis of the second switch if an engine is stopped.

3. A shifter abnormality diagnosis method for a shifter used in an automatic transmission having a manual mode, the shifter including a first switch for outputting a signal corresponding to the position of a select lever and a second switch for outputting a signal corresponding to the position of the select lever if the select lever is located in at least one of an upshift range or a downshift range, the abnormality diagnosis method comprising:
   performing an abnormality diagnosis of the second switch on the basis of an output signal of the second switch; and
   prohibiting the abnormality diagnosis of the second switch if it is determined that the select lever is not located in any one of forward ranges including the upshift range and the downshift range on the basis of an output signal of the first switch.

4. A shifter abnormality diagnosis device for a shifter used in an automatic transmission having a manual mode, the shifter including:
   a first switch for outputting a signal corresponding to the position of a select lever: and
   a second switch for outputting a signal corresponding to the position of the select lever if the select lever is located in at least one of an upshift range or a downshift range,
   the abnormality diagnosis device comprising:
   diagnosis means for performing an abnormality diagnosis of the second switch on the basis of an output signal of the second switch; and
   prohibition means for prohibiting the abnormality diagnosis of the second switch by the diagnosis means if it is determined that the select lever is not located in any one of forward ranges including the upshift range and the downshift range on the basis of an output signal of the first switch.

* * * * *